(12) United States Patent
Muentener

(10) Patent No.: US 6,844,964 B2
(45) Date of Patent: Jan. 18, 2005

(54) MICROSCOPE AND STEREO MICROSCOPE

(75) Inventor: Juerg Muentener, Balgach (CH)

(73) Assignee: Leica Microsystems (Switzerland) AG, Heerbrugg (CH)

( * ) Notice: Subject to any disclaimer, the term of this patent is extended or adjusted under 35 U.S.C. 154(b) by 85 days.

(21) Appl. No.: 10/056,048

(22) Filed: Jan. 28, 2002

(65) Prior Publication Data

US 2002/0101653 A1 Aug. 1, 2002

(30) Foreign Application Priority Data

Jan. 27, 2001 (DE) .......................... 101 03 641

(51) Int. Cl.[7] .......................... G02B 21/06; G02B 21/00
(52) U.S. Cl. .......................... 359/388; 359/363; 359/368
(58) Field of Search ............... 359/362–363, 359/368–390, 629–640; 351/200–247

(56) References Cited

U.S. PATENT DOCUMENTS

| | | | | |
|---|---|---|---|---|
| 4,451,126 A | * | 5/1984 | Riesenberg et al. | ......... 359/381 |
| 4,834,516 A | * | 5/1989 | Kajitani et al. | ............. 359/363 |
| 5,128,808 A | * | 7/1992 | Dosaka | ........................ 359/821 |
| 5,303,082 A | | 4/1994 | Obuchi et al. | ............... 359/371 |
| 5,640,270 A | * | 6/1997 | Aziz et al. | .................... 359/368 |
| 5,777,783 A | * | 7/1998 | Endou et al. | ................ 359/385 |
| 6,005,710 A | * | 12/1999 | Pensel et al. | ................ 359/379 |
| 6,069,733 A | * | 5/2000 | Spink et al. | ................. 359/388 |
| 6,088,155 A | * | 7/2000 | Tandler et al. | .............. 359/381 |
| 6,097,538 A | * | 8/2000 | Watanabe et al. | ............ 359/390 |
| 6,219,180 B1 | * | 4/2001 | Hasegawa et al. | ........... 359/387 |
| 6,226,118 B1 | * | 5/2001 | Koyama et al. | ............. 359/380 |
| 6,643,070 B2 | * | 11/2003 | Deverin et al. | ............... 359/629 |
| 6,661,572 B2 | * | 12/2003 | Spink et al. | ................. 359/372 |

FOREIGN PATENT DOCUMENTS

DE     A2 36 08 242     10/1987

* cited by examiner

*Primary Examiner*—Thong Q Nguyen
(74) *Attorney, Agent, or Firm*—Foley & Lardner LLP

(57) ABSTRACT

The invention concerns a microscope having a basic body on or in which are arranged at least one microscope objective, at least one eyepiece, and at least one beam splitter that is provided in the beam path between the microscope objective and the eyepiece and that reflects a portion of the light out of the beam path to the eyepiece or reflects images into the beam path going to the eyepiece.

15 Claims, 3 Drawing Sheets

MICROSCOPE AND STEREO MICROSCOPE

CROSS REFERENCE TO RELATED APPLICATIONS

This invention claims priority of the German patent application 101 03 641.8 which is incorporated by reference herein.

FIELD OF THE INVENTION

The invention refers to a microscope and furthermore the invention refers to a stereo microscope.

BACKGROUND OF THE INVENTION

A microscope of the species is known, for example, from U.S. Pat. No. 5,303,082. This known stereomicroscope comprises a basic body on or in which microscope objectives (which in some cases comprise components used on a shared basis), two eyepieces, and a number of beam splitters are arranged. The beam splitters are provided in the beam paths between the microscope objectives and the eyepieces. The beam splitters serve on the one band to reflect light from illuminating light sources coaxially into the beam path in order to illuminate the specimen being observed, and on the other hand to create simultaneous observation capabilities.

Also known, from German Pat. No. 36 08 242, is a slit lamp microscope for ophthalmological applications in which a beam splitter is introduced into the beam path between the microscope objective and the eyepiece in such a way that an image is reflected into the beam path going to the eyepiece. This image, which for example can be an angiography image, is overlaid on the "real" microscope image so that the viewer can compare the microscope image to the angiography image and optionally superimpose them.

It is true of all the known microscopes of the species that the beam splitter or splitters are immovably introduced into the beam path, i.e. mounted immovably on the basic body or chassis of the microscope or in a beam splitter housing.

This configuration of the known microscopes of the species has a number of disadvantages:

1. The beam splitters introduced immovably into the beam path or paths unnecessarily reduce the brightness of the microscope image when there is no need for reflection into or out of the respective beam path.
2. The arrangement of the respective beam splitters defines the direction in which any reflection into or out of the beam paths is accomplished.
3. The immovably installed beam splitters do not allow any possibility of variation, for example in terms of the ratio at which the incoming light intensity is split, the type of beam splatters used, or the like.
4. The two beam paths of the stereomicroscope of the species known from U.S. Pat. No. 5,303,082, and of other stereomicroscopes, are configured symmetrically; it is therefore not possible to reflect the microscope image out in the one beam path and reflect into the other beam path an image that is overlaid on the microscope image.

In addition, reference is explicitly made to the aforementioned existing art for explanation of any details not described here.

SUMMARY OF THE INVENTION

It is the object of the invention to develop a microscope or a stereo microscope such a way that it is left to the discretion of the user of the microscope as to whether—and if so, in which direction—he or she wishes to reflect light into or out of the microscope beam path or paths.

The above object is achieved by a microscope comprising:
- a basic body which at least one microscope objective and at least one eyepiece,
- a beam path defined by the microscope objective and the eyepiece,
- at least one beam splitter being provided in the beam path between the microscope objective and the eyepiece, wherein the beam splitter reflects a portion of the light out of the beam path to the eyepiece or reflects images into the beam path going to the eyepiece,
- a carrier on which the beam splitter is mounted, and
- a recess in the basic body into which the carrier together with the beam splitter insertable and removable.

Additionally, the above object is achieved by a stereo microscope comprising:
- a basic body which at least one microscope objective and at least one binocular eyepiece,
- a first beam path and a second beam path defined by the microscope objective and the eyepiece,
- a beam splitter being provided in each the beam path between the microscope objective and the eyepiece, wherein the beam splitters reflect a portion of the light out of the beam path to the eyepiece or reflects images into the beam path going to the eyepiece,
- a carrier on which the beam splitter is mounted, and
- a first and second recess in the basic body which releasably take up the carrier together with the beam splitter in the first and the second beam path.

BRIEF DESCRIPTION OF THE DRAWINGS

The invention will be described below in more detail with reference to an exemplary embodiment, referring to the drawings in which.

DETAILED DESCRIPTION OF THE INVENTION

Figure 2:
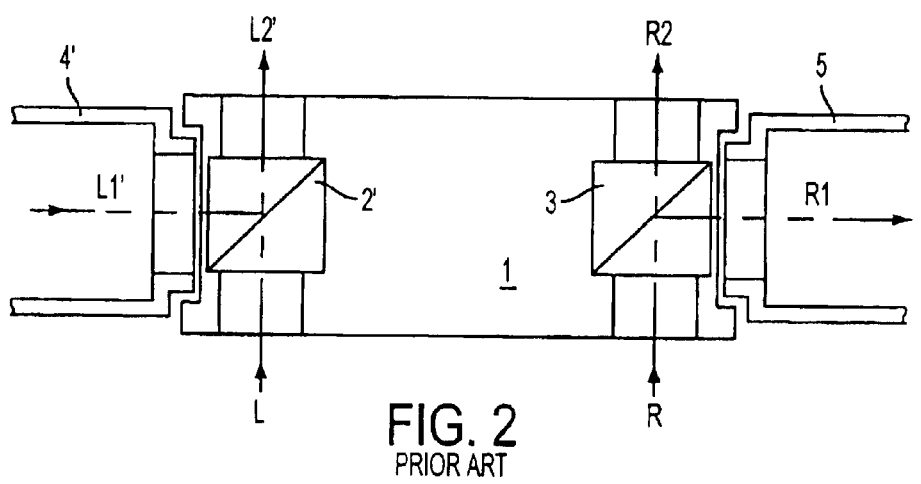
Figure 3:
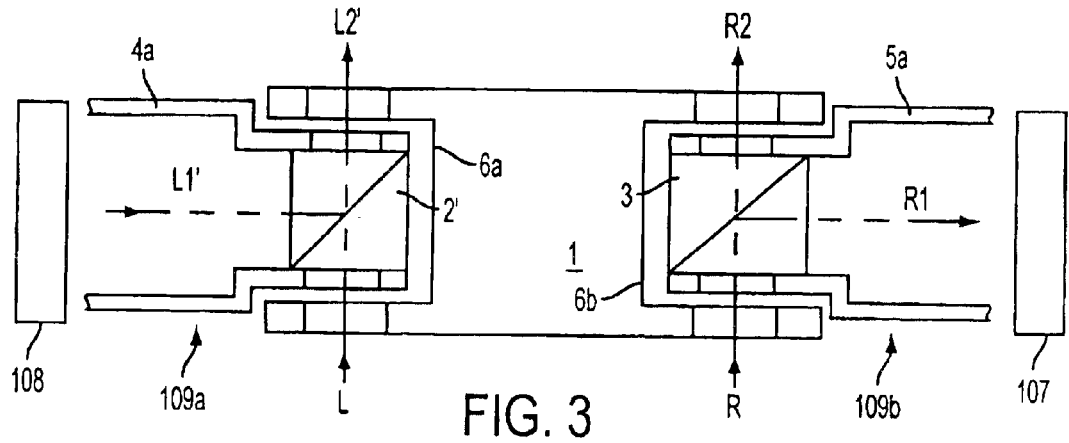
FIG. 3 shows an exemplary embodiment of the invention.

In the Figures that follow, identical parts are always labeled with the same reference characters, so that in the description of FIGS. 2 and 3, duplicate presentation of matching parts is at least partially dispensed with.

The fundamental idea underlying the invention is not to arrange beam splitters and, in particular, splitter prisms, immovably in the beam path or paths of the microscope or the beam splitter housing, but rather to use a carrier on which the beam splitter is mounted. The beam splitter or splitter prism is thus a part separate from the actual optical assemblage of the microscope, which together with the carrier can be inserted into a receptacle or recess in the basic body or chassis of the microscope, and can be removed again from the receptacle.

This configuration according to the present invention allows much greater flexibility, as compared to known microscopes, when using the microscope according to the present invention.

It is thus possible to use a variety of splitters as beam splitters. For example, a variety of intensity splitters, such as splitter prisms which reflect different intensity components or allow them to pass as a function of the particular microscope accessory used, i.e. whose splitting ratio can differ from a 50:50 ratio, can be utilized. It is also possible to use beam splitters that cause not intensity splitting but rather a wavelength-specific (i.e. wavelength-selective) and/or polarization state-specific splitting.

Further optical components can also be mounted on the carrier.

Said optical components can be, for example, filters, for example laser protection filters when a laser is used as a treatment or processing light source; or polarizers. Compensation elements that compensate for different optical effects or optical path lengths of the various beam splitters being used can also be utilized.

Since the beam splitter is, as a rule, incorporated into the calculation of the basic configuration of the optical assemblage of the microscope, it is furthermore preferred that when no beam splitter is inserted into the beam path of the microscope, there is inserted into the respective recess an element, held on a carrier, whose optical properties correspond to those of the beam splitter with the exception of the splitting effect. In the case of a splitter prism, a plane-parallel plate whose optical path length corresponds to that of the splitter prism used as the beam splitter can be used.

A very wide variety of modifications and additions are of course possible in the context of the basic idea according to the present invention.

For example, it is possible for several receptacles to be provided successively in the beam path of the microscope, so that a very wide variety of microscope accessories can be used together.

In any event, it is preferred if the carrier is fitted into the receptacle in such a way that after insertion, the beam splitter is aligned relative to the beam path without further alignment.

The carriers can moreover comprise a coding that transmits to a microscope control unit information about the microscope accessory optically connected to the microscope beam path. When a laser is used as an accessory, for example, the control unit can be informed by means of the coding that a laser is mounted on the microscope. The control unit then ensures that the laser is triggered only when a protective filter is inserted or pivoted into the beam path. The control unit can also perform an adaptation of the microscope on the basis of the coding, for example automatically pivoting into the beam path appropriate elements to compensate for the optical effects of the beam splitter being used.

A very wide variety of embodiments is also possible with regard to the configuration of the carrier.

For example, the carrier can be an integral constituent of a microscope accessory, such as a simultaneous observation unit; an illumination or treatment or processing light source whose light can be reflected, in particular coaxially, into the beam path in order to illuminate or process the specimen being observed; or a device that, in the eyepiece image, overlays on the microscope image a reflected-in image, for example an angiography image and/or displays or the like.

Alternatively, the carrier can comprise on its end facing away from the beam splitter, i.e. its end not inserted into the receptacle, a coupling onto which various microscope accessories, such as the units mentioned above by way of example, can be mounted.

It is also possible in this context for the carrier to be insertable into the receptacle of the microscope rotated 180 degrees about an axis perpendicular to the beam path, so that the beam splitter can be used for reflecting in and reflecting out depending on the insertion direction. This means a great cost savings, since it is no longer necessary to procure multiple carriers, each with different beam splitters, for different accessories. In addition, a selection can be made as desired between left and right and between reflecting in and out.

A very wide variety of known microscopes, such as stereomicroscopes and in particular surgical microscopes, can of course be used as microscopes. The invention is not limited to a specific microscope configuration.

In the context of a stereomicroscope, it is preferred if receptacles or recesses for carriers are provided in both beam paths. The configuration according to the present invention then makes it possible to insert different microscope accessories into the two beam paths in accordance with the particular application.

Figure 1:
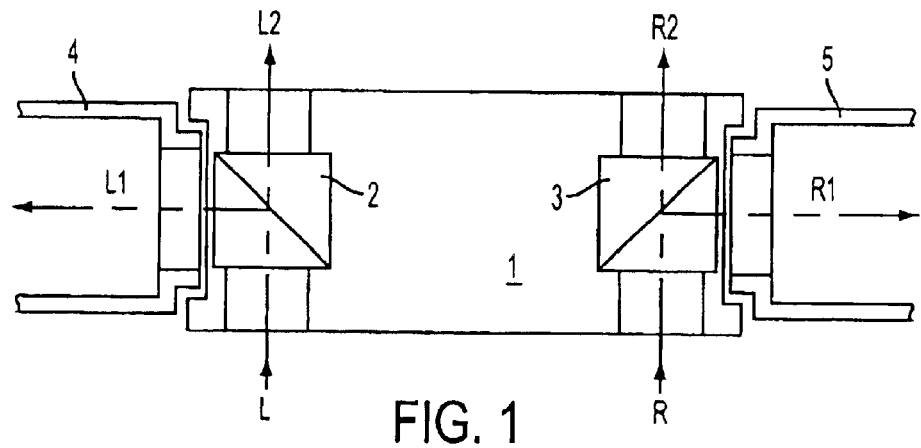
FIGS. 1 and 2 explain the existing art and the limitations of the existing art.

FIG. 1 shows the basic configuration of a known microscope. In order to simplify the depiction, both the microscope objective (or objectives) and the eyepieces are omitted. FIG. 1 depicts only a basic body part or beam splitter housing part or chassis part 1 of the microscope, in which a first beam path L and a second beam path R extend, in the direction of the arrows along the dot-dash-lines, from the microscope objectives (not depicted) or from a common objective to the eyepieces (not depicted).

In the microscope depicted in FIG. 1, splitter prisms 2 and 3, which reflect a portion of the light (L1 and R1) out of the beam path (L2 and R2) that passes through to the eyepieces, are immovably inserted into basic body part 1. In the exemplary embodiment depicted in FIG. 1, microscope accessories 4 and 5 (depicted only schematically)—which can be, for example, simultaneous observation capabilities or video receivers—are mounted on basic body part 1.

As a result of the configuration depicted in FIG. 1, the fact that beam splitting takes place, the direction and type of beam splitting, and the side selection (first or second) are all unchangeably predefined, since splitter prisms 2 and 3 used as beam splitters are immovably joined to basic body part 1.

FIG. 2 shows a variant of the microscope depicted in FIG. 1 in which, instead of splitter prism 2, a splitter prism 2' that reflects light or images in to beam path L2' (or deflects light from microscope accessory 4' into beam path L2') toward the first eyepiece (not depicted) is used. The reflected-in beam path L1' and beam path L are thus superimposed to yield beam path L2' in an observer's eye. The second beam path R corresponds to the beam path described in conjunction with FIG. 1. This variant also has the disadvantages described above.

FIG. 3 shows an exemplary embodiment of the invention in which, as in FIG. 2, splitter prisms 2' and 3 are arranged in the first and second beam paths L and R, respectively.

Unlike in the known microscopes described in conjunction with FIGS. 1 and 2, splitter prisms 2' and 3 are not joined to basic body part 1 but rather are connected to carriers 109a, 109b, respectively, the carriers 109a, 109b having couplings 4a and 5a, respectively, which are connectable to microscope accessories 108, 107, respectively. Carriers 109a, 109b of splitter prisms 2' and 3, respectively, are configured in such a way that they can be inserted into receptacles or recesses 6a, 6b of basic body part 1. The tolerances between receptacles 6a, 6b and the carriers 109a, 109b of splitter prisms 2', 3 are designed in such a way that splitter prisms 2' and 3 are aligned relative to beam paths L/L'2 and R/R2, respectively, with no further actions.

Microscope accessories 108, 107 and/or carriers 109a, 109b can of course also be exchanged with one another, or a variety of accessories, for example accessories that reflect the beam path out. Basic body part 1 can moreover also contain multiple recesses or receptacles 6a, 6b in each beam path L, R.

Figure 4:
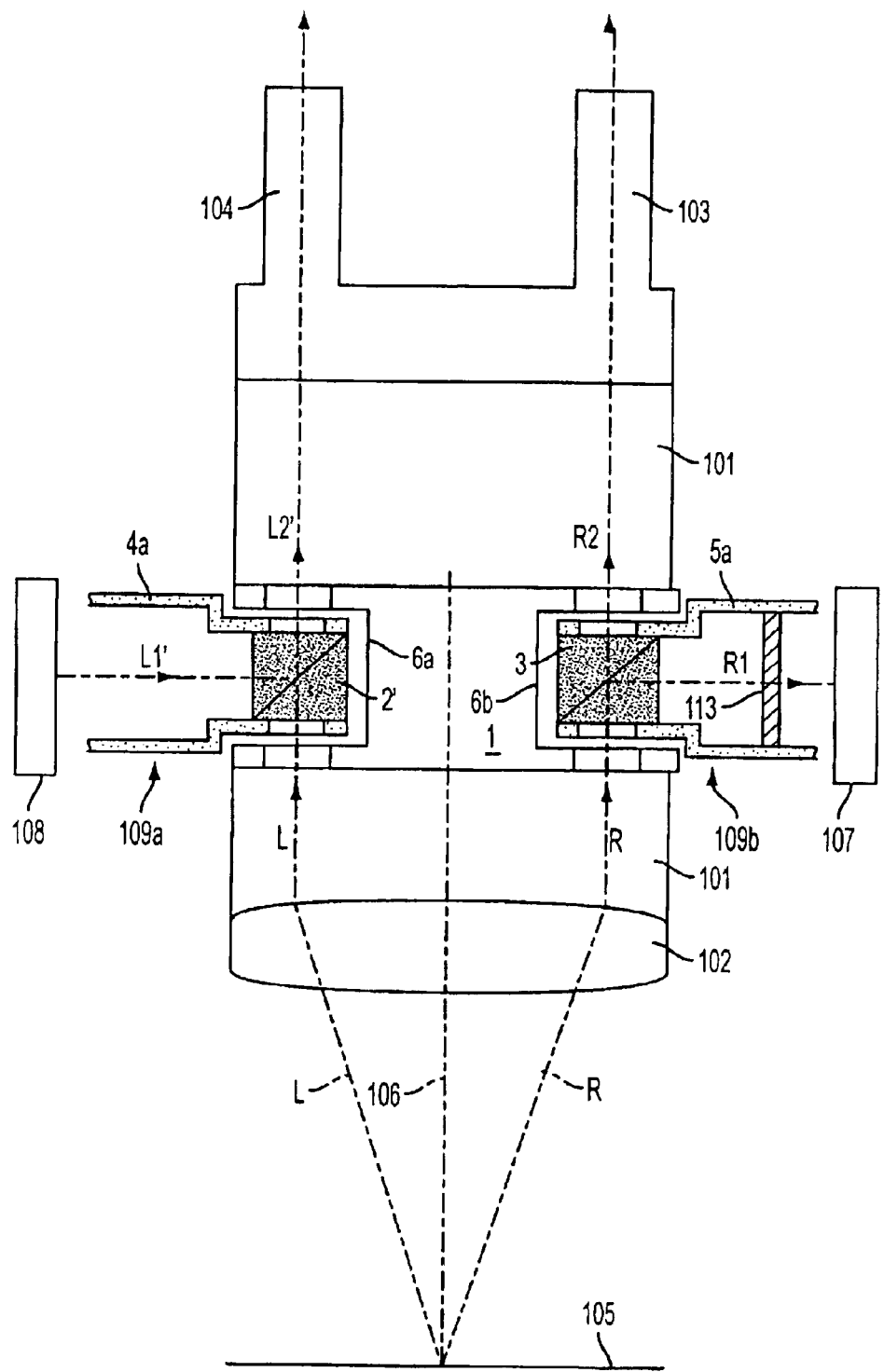
FIG. 4 shows another embodiment of the present invention.

FIG. 4 shows a microscope according to the embodiment shown in FIG. 3. A basic body 101 of a microscope comprises a basic body portion 1, a microscope objective 102 defining a microscope axis 106, and right and left eyepieces 103, 104, where the microscope is configured to image an object plane 105. Carrier 109a inserted into the left beam path L at recess 6a comprises a prism 2' and a coupling portion 4a Coupling portion 4a couples a display or image injecting unit 108 to the carrier 109a such that light and/or images created by the image injecting unit 108 along left beam path L1' is superimposed into left beam path L via prism 2' to form left beam path L2' passing to left eyepiece 104. Carrier 109b inserted into the right beam path R at recess 6b comprises a splitter prism 3 and a coupling portion 5a. Coupling portion 5a couples a camera or image observation unit 107 to the carrier 109b such that part of the light and/or images passing along right beam path R is deflected via splitter prism 3 away from right beam path R2 and along right beam path R1 toward the image observation unit 107. Carrier 109b may also comprise an optical component 113, such as a filter or a compensation element.

Figure 5:
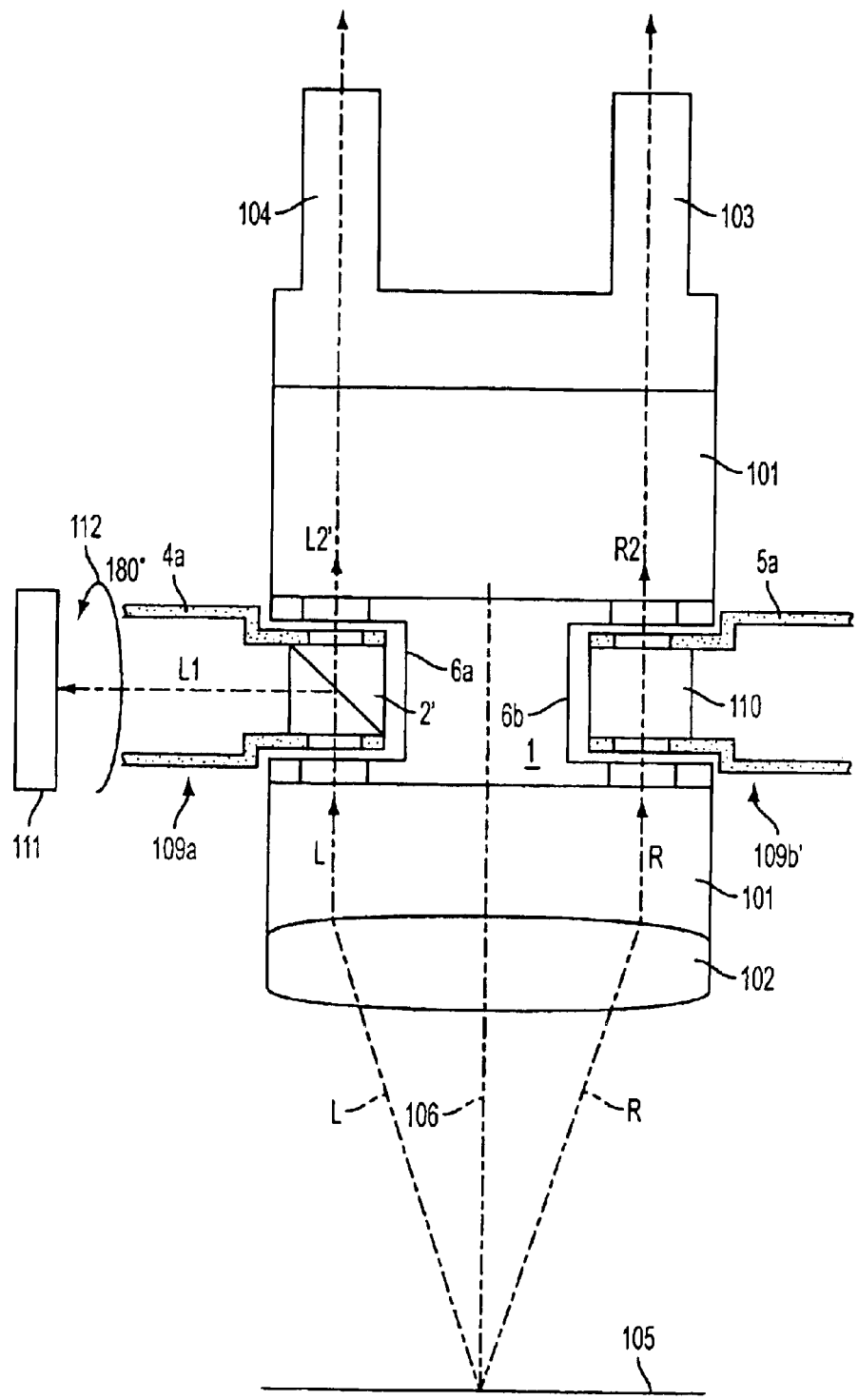
FIG. 5 shows another embodiment of the present invention.

FIG. 5 shows an embodiment similar to that shown in FIG. 4, with two main exceptions. First, carrier 109a of FIG. 4 (comprising prism 2' and coupling portion 4a) has been rotated by 180° in the direction shown by arrow 112, and microscope accessory (image injecting unit) 108 has been replaced with an image observation unit 111, similar to image observation unit 107 of FIG. 4. Because of the rotation of carrier 109a, part of the light and/or images passing on left beam path L are deflected via the prism 2' away from left beam path L2' and toward image observation unit 111 on left beam path L1. The other main difference with the embodiment in FIG. 4 is that carrier 109b has been replaced with a carrier 109b' having a plane parallel plate 110 mounted thereto and coupling portion 5a. Plane parallel plate 110 does not substantially deflect any light, so that substantially all light and/or images in right beam path R pass through plane parallel plate 110 and continue toward right eyepiece 103 via right beam path R2.

What is claimed is:

1. A microscope comprising:
    a basic body comprising at least one microscope objective and at least one eyepiece;
    a beam path defined by the at least one microscope objective and the at least one eyepiece;
    at least one beam splitter insertable into the beam path between the at least one microscope objective and the at least one eyepiece, wherein the at least one beam splitter is configured to allow a choice between reflecting a portion of light out of the beam path and reflecting images into the beam path going to the at least one eyepiece;
    a carrier on which the at least one beam splitter is mounted; and
    a recess in the basic body into which the carrier together with the at least one beam splitter are insertable and removable.

2. The microscope as defined in claim 1, wherein the carrier is fitted into the recess with sufficiently small tolerances such that after insertion, the at least one beam splitter is aligned relative to the beam path without the need for further alignment.

3. The microscope as defined in claim 1, wherein the carrier comprises on its end facing away from the at least one beam splitter a coupling onto which various microscope accessories can be mounted.

4. The microscope as defined in claim 1, wherein the microscope is a surgical microscope.

5. The microscope as defined in claim 1, wherein the microscope further comprises a plane-parallel plate, the plane-parallel plate being held on a carrier and having an optical path length corresponding to that of the at least one beam splitter, and wherein the microscope is configured so that the plane-parallel plate is insertable into the beam path when no beam splitter is inserted into the beam path of the microscope.

6. The microscope as defined in claim 1, wherein the at least one beam splitter has an optical property of being at least one of intensity-specific, wavelength-specific and polarization state-specific.

7. The microscope as defined in claim 6, wherein the at least one beam splitter is configured as a splitter prism.

8. The microscope as defined in claim 1, wherein at least one further optical component is mounted on the carrier and the further optical component comprises at least one of filters and compensation elements.

9. The microscope as defined in claim 1, wherein the carrier is configured to transmit to a control unit information about a microscope accessory optically connected to the beam path.

10. The microscope as defined in claim 9, wherein the microscope is configured to perform an adaptation of the microscope on the basis of the information.

11. The microscope as defined in claim 1, wherein the microscope is a stereo microscope comprising:
    a first beam path and a second beam path defined by the at least one microscope objective and the at least one eyepiece;
    a first beam splitter and a second beam splitter insertable in the first and second beam paths, respectively, wherein the beam splitters each reflects a portion of the light out of the beam path or reflects images into the beam path going to the at least one eyepiece;
    a first carrier and a second carrier on which the first and second beam splitters, respectively, are mounted; and
    a first and second recess in the basic body which releasably take up the first and second carriers in the first and the second beam paths.

12. The stereo microscope as defined in claim 11, wherein the first carrier comprises on its end facing away from the first beam splitter a first coupling onto which various microscope accessories can be mounted.

13. The stereo microscope as defined in claim 12, wherein the second carrier comprises on its end facing away from the second beam splitter a second coupling onto which various microscope accessories can be mounted, wherein a first microscope accessory is mounted on the first coupling and a second microscope accessory, different from the first microscope accessory, is mounted on the second coupling.

14. A microscope comprising:
    a basic body comprising at least one microscope objective and at least one eyepiece;
    a beam path defined by the at least one microscope objective and the at least one eyepiece;

at least one beam splitter being provided in the beam path between the at least one microscope objective and the at least one eyepiece, wherein the at least one beam splitter reflects a portion of light out of the beam path or reflects images into the beam path going to the at least one eyepiece;

a carrier on which the at least one beam splitter is mounted; and a recess in the basic body into which the carrier together with the at least one beam splitter are insertable and removable, wherein the carrier comprises on its end facing away from the at least one beam splitter a coupling onto which various microscope accessories can be mounted, wherein the carrier is insertable into the recess of the microscope rotated 180 degrees about an axis perpendicular to the beam path, so that the at least one beam splitter is adapted for use, in one configuration, for reflecting in and, in another configuration, for reflecting out.

15. A stereo microscope comprising:

a basic body comprising at least one microscope objective and at least one binocular eyepiece;

a first beam path and a second beam path defined by the at least one microscope objective and the at least one eyepiece;

a first beam splitter and a second beam splitter being provided in the first and second beam paths, respectively, wherein the beam splitters each reflects a portion of the light out of the beam path or reflects images into the beam path going to the at least one eyepiece;

a first carrier and a second carrier on which the first and second beam splitters, respectively, are mounted; and a first and second recess in the basic body which releasably take up the first and second carriers in the first and the second beam paths, wherein the first carrier comprises on its end facing away from the first beam splitter a first coupling onto which various microscope accessories can be mounted, wherein the first carrier is insertable into the first recess of the microscope rotated 180 degrees about an axis perpendicular to the first beam path, so that the first beam splitter is adapted for use, in one configuration, for reflecting in and, in another configuration, for reflecting out.

* * * * *